United States Patent
Kuo

(10) Patent No.: US 7,203,006 B2
(45) Date of Patent: Apr. 10, 2007

(54) CHUCKING AND FOCUSING DEVICE FOR A TELESCOPE EYEPIECE AND ITS PRODUCTION PROCESS

(75) Inventor: Paul Kuo, Tainan (TW)

(73) Assignee: Sun Long Optics Co., Ltd. (TW)

( * ) Notice: Subject to any disclaimer, the term of this patent is extended or adjusted under 35 U.S.C. 154(b) by 74 days.

(21) Appl. No.: 11/081,927

(22) Filed: Mar. 15, 2005

(65) Prior Publication Data

US 2006/0056085 A1   Mar. 16, 2006

Related U.S. Application Data

(60) Provisional application No. 60/642,343, filed on Jan. 6, 2005.

(30) Foreign Application Priority Data

Aug. 26, 2004  (TW) .............. 93213506 U
Nov. 9, 2004    (TW) .............. 93134068 A

(51) Int. Cl.
*G02B 7/02* (2006.01)

(52) U.S. Cl. ..................... 359/630; 359/829

(58) Field of Classification Search ........ 279/42, 279/43, 43.2; 285/92, 322, 354; 359/822, 359/823, 825, 829, 830
See application file for complete search history.

(56) References Cited

U.S. PATENT DOCUMENTS 2,819,527 A * 1/1958 Spurling ............ 359/428
2,865,250 A * 12/1958 Wagner ............. 359/823
5,079,646 A * 1/1992 Schwartz ........... 359/894
5,234,296 A * 8/1993 Presby et al. ........ 409/234
6,302,447 B1 * 10/2001 Lee ................. 285/86
6,337,775 B1 * 1/2002 Wilson ............. 359/819
6,511,099 B2 * 1/2003 Bartholoma et al. .... 285/140.1
6,515,806 B2 * 2/2003 Denpo ............. 359/694
7,032,932 B2 * 4/2006 Guest ............... 285/92

* cited by examiner

*Primary Examiner*—David N. Spector
(74) *Attorney, Agent, or Firm*—Bacon & Thomas PLLC

(57) ABSTRACT

A checking and focusing device for an telescope eyepiece includes an eyepiece barrel formed of an inner tube and an outer tube. The outer tube has at one end a clamping portion formed with multiple resilient segments in a radial shape. A locking ring is threaded onto the clamping portion so that rotating the locking ring can gradually constrict the resilient segments to clamp the eyepiece tightly without biasing its axis. A production process for the chucking and focusing device for an telescope eyepiece includes two steps. One step is to machine multiple lengthwise grooves in an inner surface of a metal tube, the thickness of the grooves being the same as the depth of the resilient segments. The tube is then machined until the grooves are exposed, forming a single elastic strip between every two grooves, forming the clamping portion of the tube.

3 Claims, 8 Drawing Sheets

CHUCKING AND FOCUSING DEVICE FOR A TELESCOPE EYEPIECE AND ITS PRODUCTION PROCESS

REFERENCE TO RELATED APPLICATION

The present application claims the priority of provisional patent application Ser. No. 60/642,343 of inventor Chun-Chang Kuo (a.k.a. Paul Kuo) titled "Chucking and Focusing Device For a Telescope Eyepiece and its Production Process" filed Jan. 6, 2005 in the United States Patent and Trademark Office.

BACKGROUND OF THE INVENTION

1. Field of the Invention

This invention relates to a chucking and focusing device for a telescope eyepiece and its production process, particularly to one possible to clamp and focus an eyepiece without significant eccentricity, and a method for producing it.

2. Description of the Prior Art

A conventional Newtonian reflective telescope shown in FIGS. 1 and 2, includes a tubing body 10, an eyepiece barrel 20 fixed vertically on one side of the barrel body 10 and having one end fitting around an eyepiece 21. The eyepiece 21 and the eyepiece barrel 20 are tightly combined together with a screw 22. The eyepiece barrel 20 comprises an outer tube 23 and an inner tube 24, and the outer tube 23 is connected tightly with tubing body 10. Further, two adjusting wheels 240 are provided to be connected with the outer tube 24, and a worm 241 connects the two adjusting wheels 240. The inner tube 23 has a rack 230 fixed lengthwise on its outer surface, and the rack 230 engages the worm 241 in case of the inner tube 23 extending in the outer tube 24, so that the worm 241 rotates when the adjusting wheel 240 is rotated for adjustment. The rack 230 and the inner tube 23 are extended or retracted for focusing the eyepiece 21, according to the rotation of the adjusting wheels.

However, the conventional telescope has following disadvantages in usage.

1. The eyepiece 21 has one end extending and fixed in the inner tube 23 of the eyepiece barrel 20, by the screw 22 entering the inner tube 23 and clamping the eyepiece 21. This way of fastening obviously pushes the optical axis of the eyepiece 21 away from the axis of the eyepiece barrel causing eccentricity between two axes, and thus causing difficulty of focusing for a good image quality.

2. When the inner tube 23 and the outer tube 24 are adjusted in their length, it has to depend on matching movement of the two adjust wheels 240, the worm 241 and the rack 230, complicated in its structure, and subsequent high cost, and rather slow in its adjusting speed.

SUMMARY OF THE INVENTION

This invention has been devised to provide a simplified chucking and focusing structure for a telescope, minimizing eccentricity of axes between an eyepiece and an eyepiece barrel.

Another purpose of the invention is to offer a production method for the clamping chuck.

One aspect of the invention is a chuck provided with male threads on an end connected with an eyepiece, and multiple resilient segments formed on the outer end section with their ends expanding outward a little forming a clamping portion. Further a locking ring is provided with female threads to engage the clamping portion and an annular projecting ridge is formed in an inner surface of the locking ring and located outside the resilient segments. Then the eyepiece is inserted in a space defined by the resilient segments. Rotating the locking ring can force the projecting ridge to move toward the end of the resilient segments so that the resilient segments may clamp the eyepiece tightly, with the axis of the eyepiece not biased from the axis of the eyepiece barrel after adjustment.

Another aspect of the invention is a method to produce the chuck for clamping and focusing. The method comprises steps of machining, by a turning lathe, an outer end section of a metal tube which is provided in advance with multiple longitudinal grooves along an inner wall of the tube, to form multiple resilient segments defied by the grooves.

BRIEF DESCRIPTION OF DRAWINGS

This invention will be better understood by referring the accompanying drawings, wherein:

FIGS. 7-1, 7-2, and 7-3 are structural views of the chuck in this invention; and, FIGS. 8-1, 8-2, 8-3 and 8-4 are perspective views of the chuck being formed in order with four steps in this invention.

DETAILED DESCRIPTION OF THE PREFERRED EMBODIMENT

Figure 3:
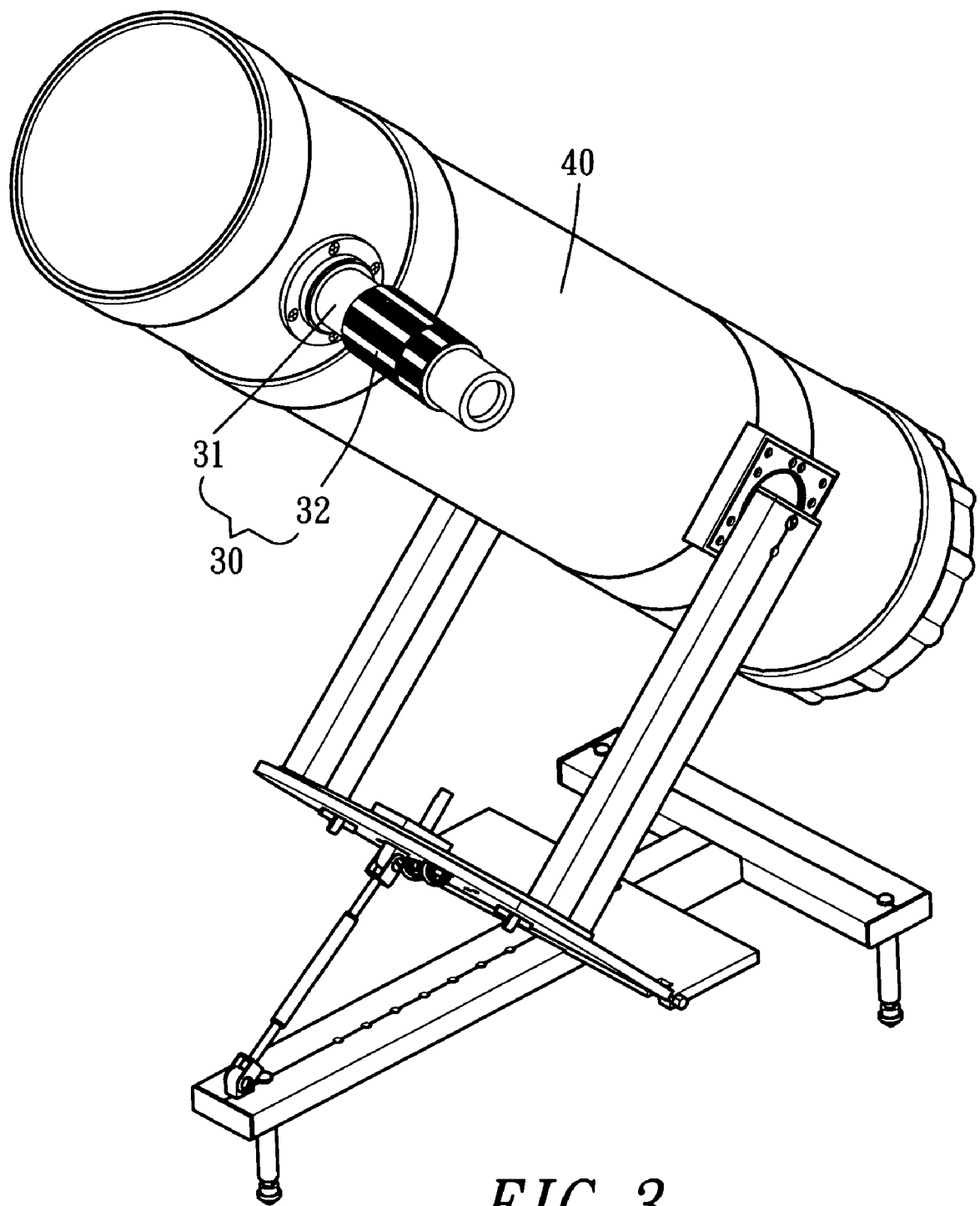
FIG. 3 is a perspective view of a telescope with an eyepiece chuck and focusing device in the this invention.
Figure 4:
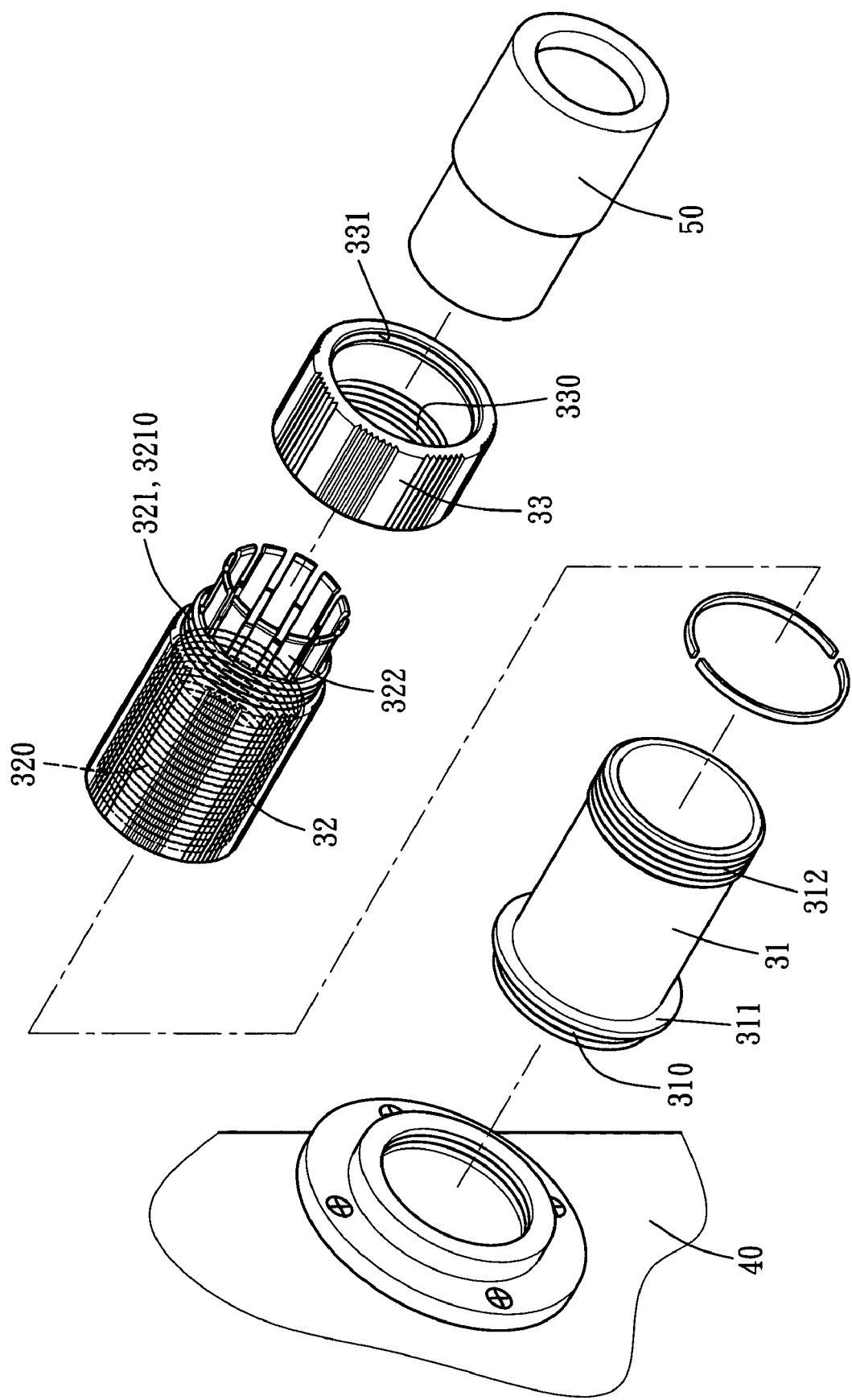
FIG. 4 is an exploded perspective view of the chuck in this invention.

A preferred embodiment of a chuck for focusing a telescope eyepiece in this invention as shown in FIGS. 3, and 4, includes an eyepiece barrel 30 comprising a fixed tubular member (inner tube) 31 and a second tubular member (outer tube and clamp or chuck) 32 combined together.

Figure 5:
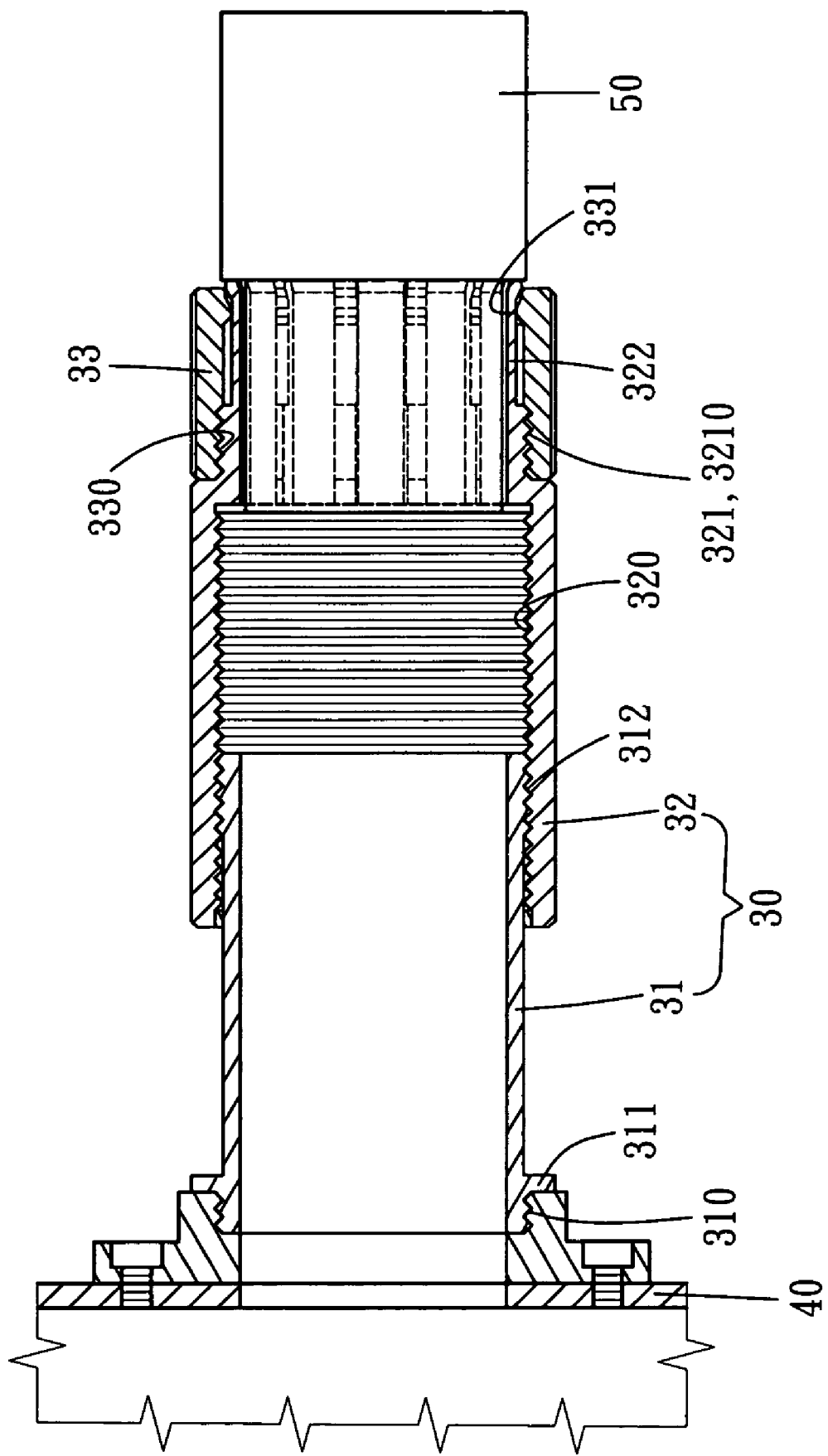
FIG. 5 is a partial cross-sectional view of the chuck in this invention.

The inner tube 31, referring to FIGS. 4 and 5, is provided with first male threads 310 at one end, a stop flange 311 just behind the male threads 310, and second male threads 312 at the other end. The male threads 310 engage a cylindrical body 40 of a telescope, and the stop flange 311 is to be stopped by an outer wall of the cylindrical body 40.

The outer tube 32 has a first end provided with female threads 320 to engage the male threads 310 of the inner tube 31, and a neck 321 toward a second end having a reverse male threads 3210. A plurality of axially extending slots are defined in the second end to form a plurality of resilient segments 322 extending from the neck 321 and expanding outward a little. The neck 321 and resilient segments 322 form a clamping portion of the outer tube 32.

A locking ring 33 is further provided, having reverse female threads 330 in an inner wall and an annular projecting ridge 331 contacting the outer wall of the resilient segments 322. The reverse female threads 330 engage the reverse male threads 3210 of the neck 321 to form a clamp or chuck for retaining an eyepiece in the second end of the outer tube 32.

In using the assembly as described above, referring to FIG. 5, there are three ways as follows.

Figure 6:
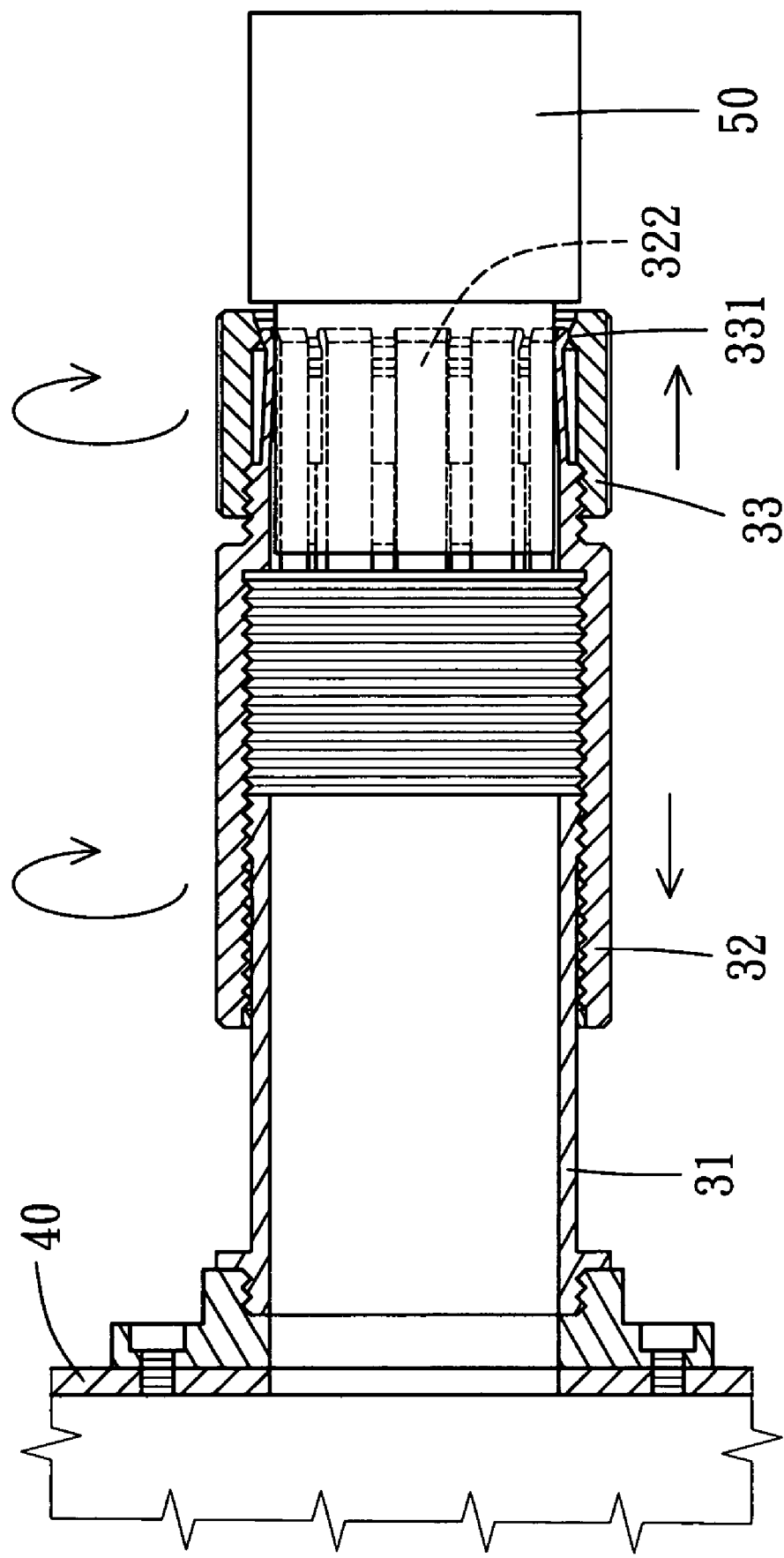
FIG. 6 is a cross-sectional view of the chuck moved in a way in this invention.

1. In adjusting the length of the inner tube 31 and the outer tube 32, the outer tube 32 is rotated only in the clockwise direction to shrink the total length of the eyepiece barrel 30, as shown in FIG. 6. On the contrary, if the outer tube 32 is rotated in counterclockwise, the eyepiece barrel 30 is lengthened.

2. To clamp the eyepiece 50 in position, the locking ring 33 is rotated clockwise. Then the projecting ridge 331 of the locking ring 33 moves towards the expanded end of the resilient segments 332, as shown in FIG. 6 so that the projecting ridge 331 constricts the resilient segments 332 to clamp the eyepiece 50 more tightly. As the eyepiece 50 is clamped by the resilient segments 332, which are constricted by the locking ring 33, the axis of the eyepiece 50 after clamping may be the same as the axis of the eyepiece barrel 30, not biased. In case the eyepiece 50 is needed to be removed, the locking ring 33 is rotated in counterclockwise, and the locking ring 33 moves, because of the reverse female threads 330 engaging the reverse male threads 3210, so that the projecting ridge 331 of the locking ring 33 moves towards the base of the resilient segments 332, no longer constricting the ends of the resilient segments 322, permitting the eyepiece 50 to be easily removed from the resilient segments 322.

3. The inner tube 31 and the outer tube 32 are threadably combined in the clockwise direction, while the locking ring 33 and the outer tube 32 are threadably combined in the counterclockwise direction, so if the outer tube 32 is rotated to lengthen the eyepiece barrel 30, and the user erroneously rotates the locking ring 33 and not the clamp 32 in the clockwise direction, the locking ring 33 only can constrict the resilient segments 322 to tighten further, with no fear of the eyepiece 50 fallen off.

Figure 7:
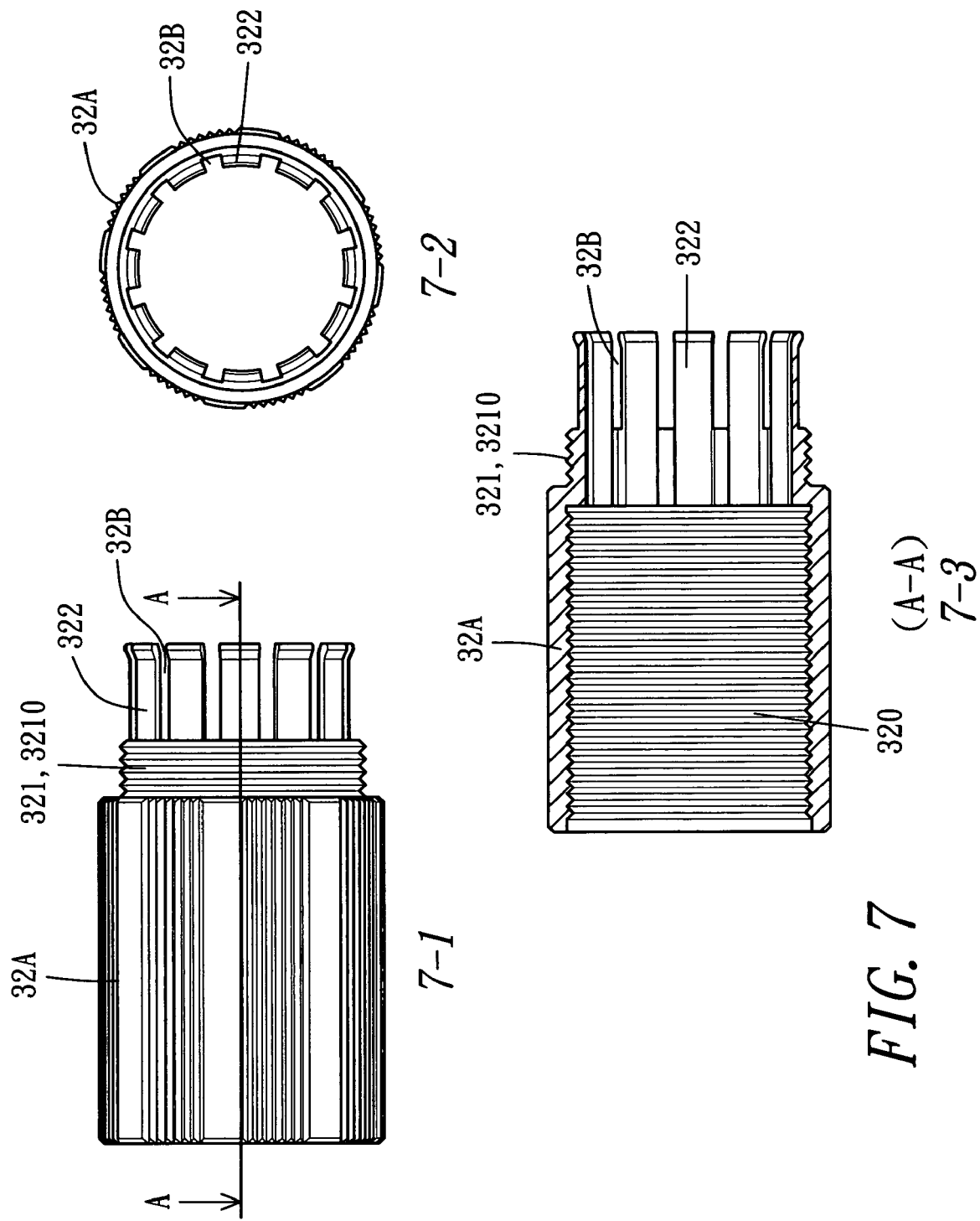

The production process for the outer tube and clamp 32 in the invention is to be described now. The outer tube 32 is made of metal, as shown in FIG. 7, having one end formed with normal female threads 320, and the other end formed with the resilient segments 322 of a circular shape for retaining the eyepiece 50, and reverse male threads 3210 formed in the base of the elastic strips 322.

Figure 8:
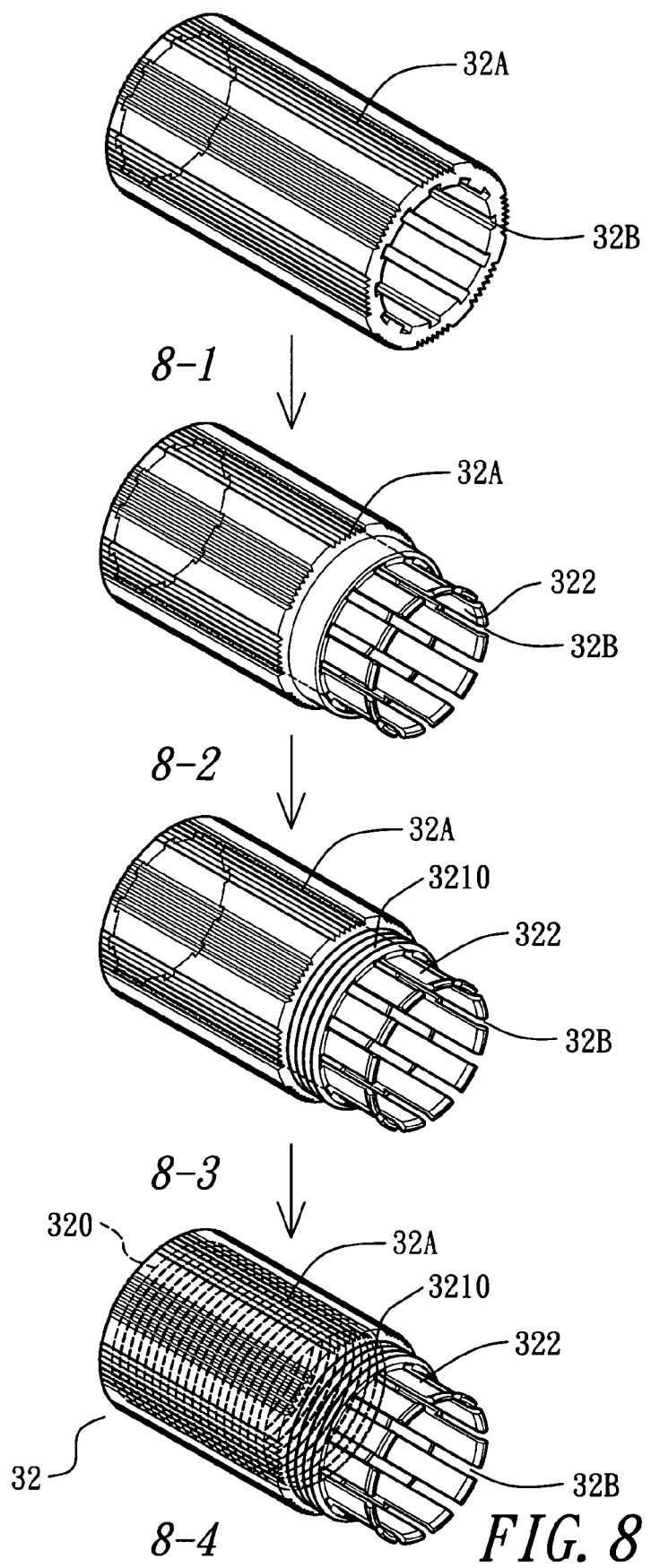

1. A first step is preparing a hollow metal tube 32A with plural straight male threads on the outer surface and with plural lengthwise grooves 32B spaced apart in an inner surface, as shown in FIG. 8. The depth of the lengthwise grooves 32B is as deep as the thickness of the finished resilient segments 322.

Figure 1:
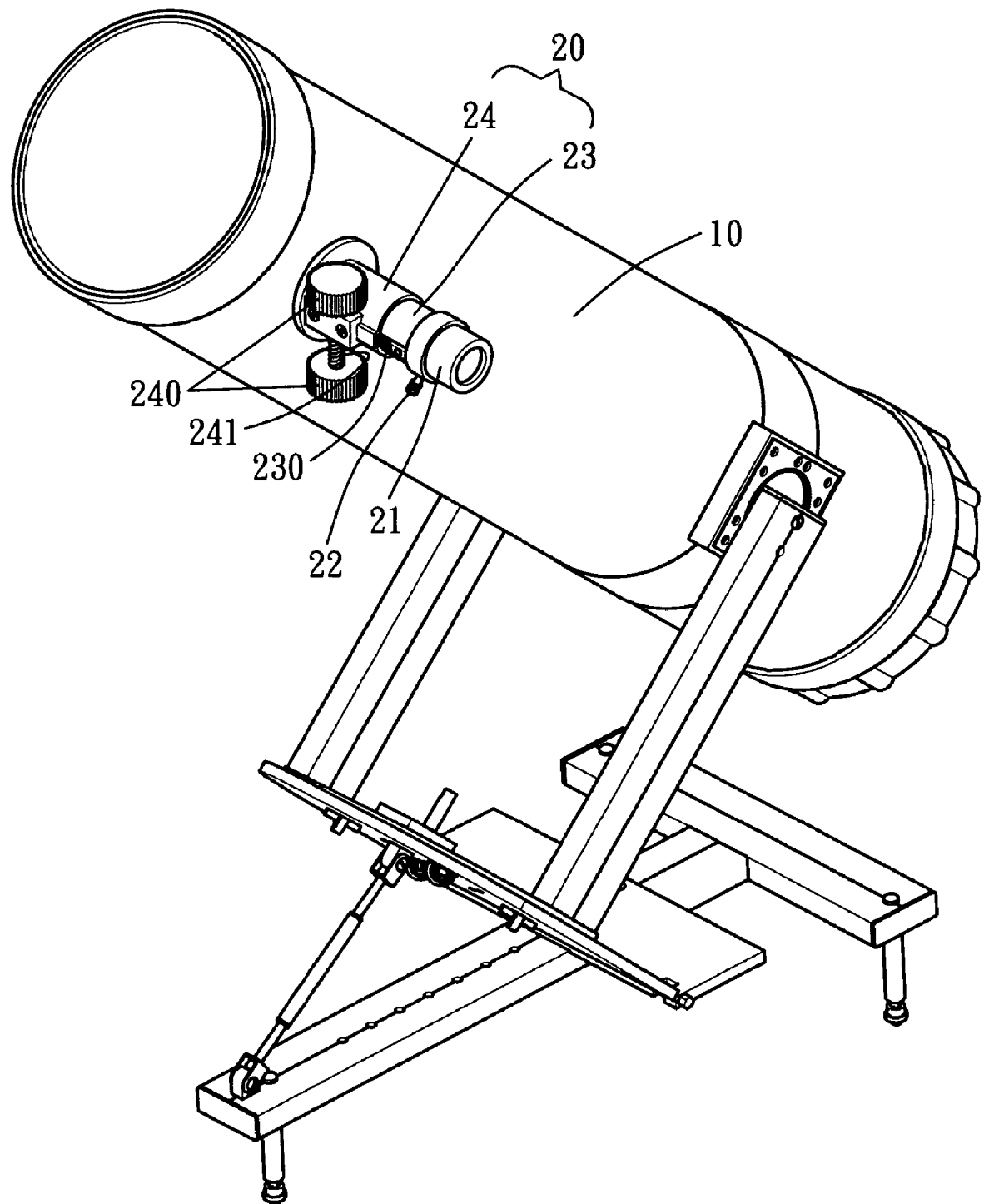
FIG. 1 is a perspective view of a conventional telescope.
Figure 2:
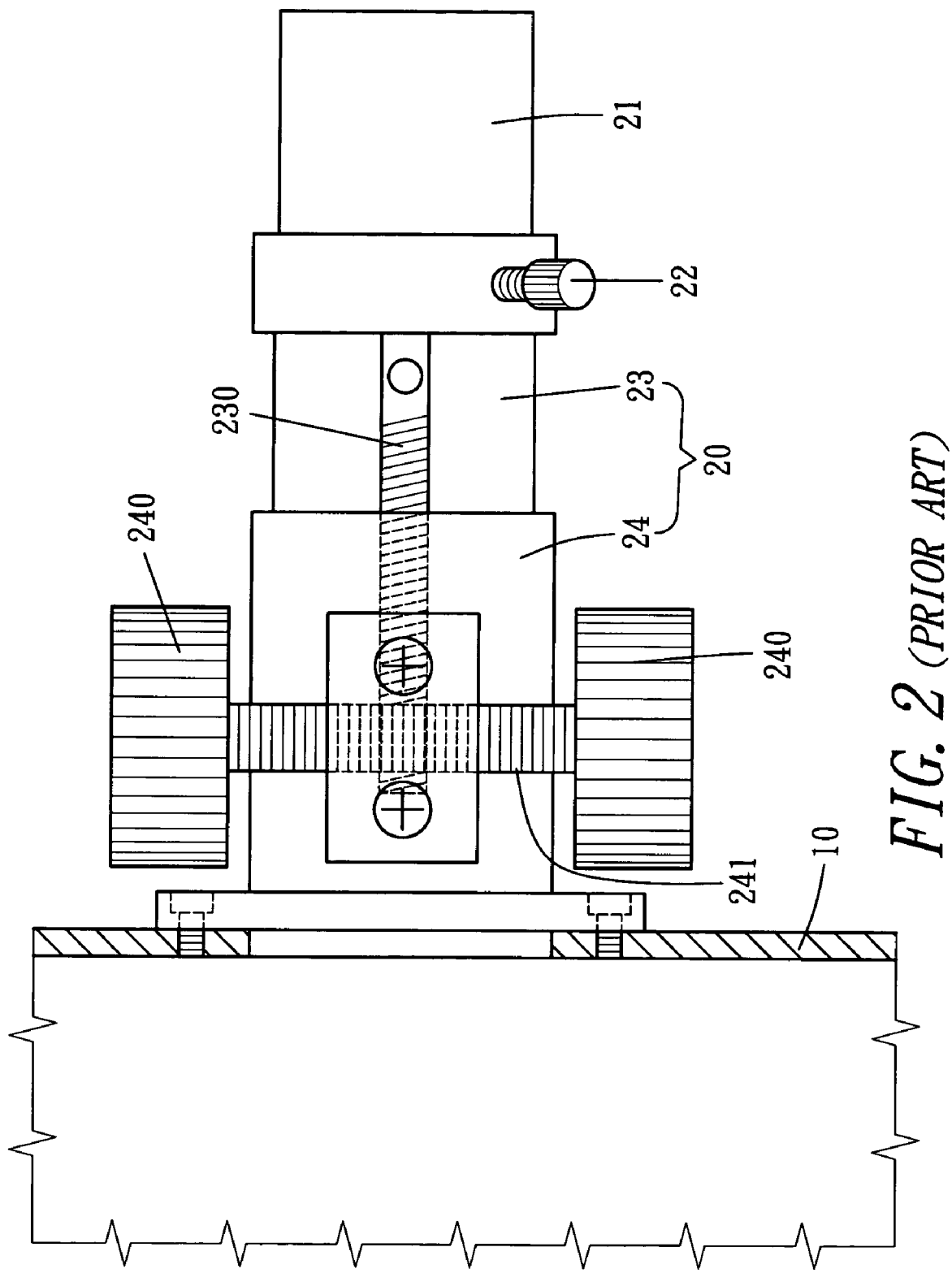
FIG. 2 is a partial front view of the conventional telescope.

2. A second step is to machine the metal tube 32A (preferably aluminum) for forming the outer end section with the resilient segments 322 with a needed length until the lengthwise grooves 32B are exposed Then the part between every two grooves becomes one of the resilient segments 322, as shown in FIG. 8-2. If the inner surface of the resilient segments 322 is needed to be added with frictional moderation, it has to be done before the lengthwise groove 232B formed.

3. A third step is to form the reverse male threads 3210 at the base of the resilient segments 322, as shown in FIG. 8-3.

4. The fourth step is to form clockwise female threads on the other end, as shown in FIG. 8-4.

The thickness of the resilient segments 322 is the same as the depth of the lengthwise grooves 32B. If the thickness of the elastic strips 322 is desired to be thicker, the lengthwise grooves 32B have to be thicker, too. The process in the invention can surely make the outer tube 32 to have thin resilient segments 322, improving the drawback of the conventional clamper.

In general, the eyepiece barrel 30 can be made very simple for adjusting, and the eyepiece 50 may have the axis the same as the axis of the eyepiece barrel 30, with the eyepiece 50 easily and accurately positioned.

While the preferred embodiment of the invention has been described above, it will be recognized and understood that various modifications may be made therein and the appended claims are intended to cover all the medications that may fall within the spirit and scope of the invention.

What is claimed is:

1. A telescope eyepiece assembly comprising:
    a first tubular member having a first end configured for engagement with the body of a telescope and a threaded second end;
    a second tubular member having a threaded first end configured for engagement with the second end of said first tubular member, and an externally threaded neck near a second end, a plurality of axially extending slots being defined in the second end to form a plurality of resilient segments extending from said neck; and
    a locking ring having an internally threaded first end configured for engagement with the externally threaded second end of said second tubular member, the locking ring having an annular ridge projecting from an internal surface thereof;
    wherein said annular ridge encircles said plurality of resilient segments when the locking ring is engaged with the externally threaded second end of said second tubular member, whereby said resilient segments are flexed radially inward as said locking ring is tightened to retain in place an eyepiece inserted in the second end of said second tubular member;
    whereby rotation of said second tubular member results in axial movement of an eyepiece retained inserted in the second end of said second tubular member for focusing said telescope.

2. The telescope eyepiece assembly according to claim 1, wherein the first end of said first tubular member is externally threaded.

3. The telescope eyepiece assembly according to claim 1, wherein threads of the threaded first end of the second tubular member and the threaded second end of the first tubular member are configured for engagement by a first direction of rotation, and threads of said externally threaded neck and the internally threaded first end of said locking ring are configured for engagement by a second direction of rotation.

* * * * *